United States Patent Office 3,450,682
Patented June 17, 1969

3,450,682
PROCESS FOR PREPARATION OF CRYSTALLINE HIGH POLYMERS OF OLEFINS
Juntaro Sasaki, Iwakuni-shi, Tadaichi Tokuzumi, Ootake-machi, and Toshio Senoue, Ootake-shi, Japan, assignors to Mitsui Petrochemical Industries, Ltd., Tokyo, Japan, a corporation of Japan
No Drawing. Filed Nov. 9, 1964, Ser. No. 409,931
Claims priority, application Japan, Nov. 14, 1963, 38/60,895; Mar. 24, 1964, 39/15,897
Int. Cl. C08f 1/42, 15/04, 15/40
U.S. Cl. 260—80.78   6 Claims

ABSTRACT OF THE DISCLOSURE

Process for the preparation of solid polyolefine having a high stereo-regularity and crystallinity comprising polymerising propylene or a mixture of propylene with ethylene by the use of a three-component catalyst composed of (1) a product obtained by the reaction of a halogen compound of a transition metal at the highest valency with an organometallic compound, (2) an aluminium alkoxy compound represented by the general formula $AlR_n(OR')_{3-n}$ (R and R'=monovalent hydrocarbon radicals; $n=1$ or 2) and (3) a halide of a metal of Groups I-B, II-B, III-B, IV-B and V-B of the Periodic Table.

This invention relates to a process for preparation of high polymers and copolymers of 1-olefins having high crystallinity and stereo-regularity by using a novel catalyst composition.

Hitherto the use of a mixture of transition metal halides (the halides of the metals of Groups IV–VI and Group VIII of the Periodic Table) and organometallic compounds, especially aluminium alkyl compounds as a polymerization catalyst for olefins has been known. This catalyst system is not yet satisfactory in that its polymerization activity is not high enough and the physical properties of the obtained polymers are not fully satisfactory. From this point a number of attempts have been made to 1-olefin polymers. As one of such catalyst systems there has been known a combined catalyst of an active complex produced by reacting a halide of a transition metal and look for catalysts having high activity in order to obtain an aluminium compound, and alkyl aluminium alkoxide. However, when with the use of this catalyst, 1-olefins having not less than 2 carbon atoms such as, for example, propylene, are singly polymerized or copolymerized with ethylene or other 1-olefins, almost all of the obtained polymers possess atactic structure, low crystallinity and are in the state of rubber-like wax containing a large amorphous part therein. In the case of propylene, for example, the obtained polymer has only about 25% of crystallinity.

The primary object of this invention is to provide a catalyst composition having very high polymerization activity and being capable of producing 1-olefin polymers which possess high crystallinity and high stereoregularity. Another object of this invention is to provide a process for preparation of 1-olefin polymers having high crystallinity and high stereoregularity by using a novel catalyst composition.

This invention relates to a process for preparation of 1-olefin polymers and copolymers having high crystallinity which comprises polymerizing at least one 1-olefin (of not less than 2 carbon atoms) in the presence of a catalyst composition (in a catalytic amount) which is prepared by admixing the following three components:

(1) The reaction products obtained by reacting (a) the halogen compounds of metals at the highest valency selected from the group consisting of the metals of Groups IV–A, V–A and VI–A of the Periodic Table and (b) the organometallic compounds of metals selected from the group consisting of alkali metals, alkaline earth metals, zinc, cadmium and earth metals.

(2) The compounds represented by the general formula:

$$AlR_n(OR')_{3-n} \tag{I}$$

wherein R and R' are monovalent hydrocarbon radicals and $n$ is an integer from 1–2.

(3) The halides of metals selected from the group consisting of the metals of Groups I–B, II–B, III–B, IV–B and V–B of the Periodic Table. The catalyst system of this invention which contains as the third component the halides of metals selected from the groups consisting of metals which belong to Groups I–B, II–B, III–B, IV–B and V–B of the Periodic Table, differs from a catalyst comprising in combination only the two above components (1) and (2), in that by using this system the obtained polymers thereby have high crystallinity and the catalyst per se is a quite different catalyst composition having a catalytic action dissimilar to the two component system.

In preparation of the catalyst of this invention, a process for preparation of the reaction product between the first component, halogen compounds of the transition metals (halogen compounds of the metals of Groups IV–A— VI–A of the Periodic Table) and organometallic compounds is already known. In this invention, from among the above generally given compounds, the reaction products between halogen compounds of titanium, vanadium, etc. at the highest valency such as, for example, titanium tetrachloride and vanadium (V) oxychloride and alkyl aluminium wherein the alkyl radical has 1–4 carbon atoms such as, for example triethylaluminium, diethyl aluminium chloride, ethyl aluminium dichloride or ethyl aluminium sesquichloride may be used in particular.

Explaining the case of titanium tetrachloride as an example, there are the combinations of reaction as shown below:

$$3TiCl_4 + AlR_3 \tag{II}$$
$$2TiCl_4 + AlR_2Cl \tag{III}$$
$$3TiCl_4 + (AlRCl_2 + AlR_2Cl) \tag{IV}$$
$$TiCl_4 + AlRCl_2 \tag{V}$$

Any of the reaction products obtained in the above reaction may suitably be employed. These reaction products contain active complex which is insoluble in liquid hydrocarbon. In general, the so obtained reaction products are more preferably used when the insoluble substances are washed with liquid hydrocarbon, thus separating the unreacted substances and suspending said insoluble substances in liquid hydrocarbon. However, the reaction products may sometimes be used without washing with liquid hydrocarbon.

The second component of the catalyst are the compounds represented by the afore-given general formula $$AlR_n(OR')_{3-n} \tag{I}$$

wherein R and R' are monovalent hydrocarbon radicals and $n$ is an integer from 1 to 2.

Generally, R and R' are preferably an alkyl or aryl radical and R and R' may be the same or different. Further it is desirable that R and R' are the lower alkyl radicals such as methyl, ethyl, propyl and butyl radicals and aryl radicals such as phenyl radical. Thus, diethyl aluminium ethoxide, diethyl aluminium phenoxide, diethyl aluminium methoxide, diphenyl aluminium phenoxide, ethyl aluminium dipropoxide, ethyl aluminium diphenoxide, etc. are used. Among these compounds, a dialkyl aluminium alkoxide whose alkyl radical has 1–4 carbon atoms is particularly suitable.

As the halides of metals of Groups I–B, II–B, III–B,

IV-B and V-B of the Periodic Table to be used as the third component of the catalyst of this invention, there are a great number of halides such as the chlorides, bromides and iodides of Cu, Ag, Zn, Cd, Hg, Ge, Sn, Pb, P, As, Sb, Bi and Al. Particularly useful are copper (I) chloride copper (II) chloride, zinc chloride, cadmium chloride, mercury (I) chloride, mercury (II) chloride, tin (IV) chloride, lead (II) chloride lead (IV) chloride, antimony (III) chloride, antimony (V) chloride and aluminium chloride. That these compounds are anhydrides is favorable for practical use. Also, the use of bromides has an effect in elevating crystallinity of olefin polymers.

In carrying out the present invention, the mol ratio between the first component of the catalyst, the active complex of the halide of a transition metal and an organometallic compound, and the second component such as, for example dialkyl aluminium alkoxide may be varied in a wide range of 10:1 to 1:20. Usually a mol ratio such as 5:1 to 1:3 may suitably be used. The third component of the catalyst, the halides such as, for example aluminium chloride may be used in a ratio of 0.1–10 mols to 1 mol of the second component, and usually it is preferable to use the third component in an amount less than 1 mol per 1 mol of the second component.

According to the present invention, in preparing the above described catalyst composition, a variety of conditions concerning the mixing order, mixing temperature and mixing apparatus for respective component of the catalyst may optionally be selected. However, the mixing order of each catalyst component is most preferable when the second component, e.g. alkyl aluminium alkoxide and the third component, the halides of the above-mentioned metals, e.g. aluminium chloride are first contacted and thereafter mixed with the first component, the complex compound produced by reacting a halogen compound of a transition metal with the aforementioned organometallic compound. The mixing temperature is particularly suitable in a range between −20° C. and 100° C. In mixing, if necessary, proper diluent, for example n-heptane, kerosene or the like is preferably used. The mixing concentration in this case may be varied in a very wide range from a very low concentration of 0.1 mmol/l. to that of entirely undiluted nature.

The 1-olefins to be used in the process of this invention are the olefins having not less than 2 carbon atoms, e.g., ethylene, propylene, n-butene-1, pentene-1 and styrene. In this invention, in view of the specific properties of the above catalyst composition, 1-olefins, namely asymmetrical olefin hydrocarbons which are suited for obtaining high polymers having high stereo-regularity may favorably be used. Among asymmetrical olefinic hydrocarbons, propylene is most suitable for this invention. It is of course possible to use ethylene in this invention, but it should be understood that ethylene may be used only for the purpose that high polymers having high stereo-regularity may be produced by its use along with asymmetrical olefinic hydrocarbons such as propylene as a monomeric component of the copolymer.

In carrying out the process of this invention, the polymerization conditions may be varied in a wide range. For example, the polymerization process may be carried out either batch-wise or continuously. Polymerization may be carried out with or without the use of inert organic diluent such as liquid saturated hydrocarbons, for example n-heptane. In polymerization, the pressure and temperature may properly be selected depending on the types of monomers to be used, concentration of the catalyst, the degree of polymerization of the polymers to be obtained and the like. Usually, the polymerization temperature of −20° C. to 100° C. and the pressure in the range of reduced pressure to approximately 50 atmospheres are to be used.

Thus, in accordance with the process of this invention, high polymers of 1-olefins having high stereo regularity may be obtained in much higher yields as compared with the use of known catalyst system.

This invention shall be further explained with reference to the examples as follows:

Example 1

Process for preparation of the first catalyst component which is insoluble in hydrocarbon.—Some 386 mmols of diethyl aluminium chloride were dissolved in 1-liter of kerosene distilled in the presence of potassium-sodium alloy, and 594 mmols of titanium tetrachloride were added dropwise while stirring in nitrogen atmosphere at room temperature. Instantly, a brown or dark brown precipitate was formed, but stirring was continued for additional 3 hours, and thereafter the system was left to stand still to complete the precipitation. By decantation the precipitate was separated from the mother liquor, washed with kerosene which had been refined by the above method and the operation was repeated several times. Then the precipitate was added to refined kerosene, shaken well and suspended. In this case the precipitate contains titanium trichloride, and the concentration can be determined by titration.

Preparation of the catalyst and polymerization of propylene.—A separately provided polymerization vessel equipped with a stirrer, a thermometer and a gas inlet filled with 250 ml. of refined kerosene was charged with 10 ml. of kerosene solution of diethyl aluminium ethoxide (concentration 1.0 mol/l.) while stirring in an atmosphere of nitrogen gas, and 5 ml. of kerosene suspension of copper (I) chloride (concentration 1.0 mol/l.) were introduced. Thereafter 14.8 ml. of the above titanium trichloride complex suspension (containing 1.01 mol of titanium per liter) were added. While stirring, the mixture was heated to a temperature of 70° C. followed by the continuous introduction of propylene to cause the polymerization. After 4 hours the introduction of propylene was stopped and the resultant mixture was treated with an aqueous solution of methanol-hydrochloric acid.

The product mixture was further well washed, then dried under reduced pressure and 118 g. of polypropylene in white powder form were obtained. The obtained polymer was subjected to fractional extraction with boiling n-heptane by Soxhlet extractor, and it was observed that the undissolved polymer was 89% and from the result of the analysis of X-ray diffraction spectrum and infrared spectrum the polymer was found to be polypropylene having high crystallinity. The intrinsic viscosity of the polymer insoluble in boiling n-heptane measured in Decalin at 135° C. was 2.55 and the viscosity average molecular weight as calculated from the R. Chang formula [J. Polymer Sci., 28 116 (1958)] was $29 \times 10^4$.

When the polymerization was performed under such conditions as described in the above except that copper (I) chloride was not used, the waxy polymer most of which consisted of an amorphous low polymer was obtained. When the obtained polymer was extracted with boiling n-heptane, that part of the polymer which was insoluble in boiling n-heptane accounted for only 20%.

Also, when propylene was polymerized under the same conditions except that the titanium trichloride complex suspension was not used, a polymerization product was hardly obtained.

Example 2

Propylene was polymerized under the same conditions as in Example 1 except diethyl aluminium phenoxide was used in place of diethyl aluminium ethoxide and 93 g. of white powder of polypropylene were obtained. The polypropylene thus obtained was extracted with boiling n-heptane and the polymer insoluble in the solvent reached 90%. This viscosity average molecular weight of this polymer was $33 \times 10^4$.

Example 3

Under the same conditions as in Example 1 polymerization was carried out by introducing a mixed gas consisting of 88% by volume of propylene and 12% by volume of ethylene, in the presence of catalyst system containing copper (I) chloride. After 4 hours, 68 g. of white solid polymer in powder form were obtained. The residue of this polymer after extraction with boiling n-heptane was 68%.

When the same conditions as in the above except no copper (I) chloride was used, and a mixed gas consisting of ethylene and propylene was polymerized, there was obtained a polymer in a waxy state, 25% of which was insoluble in boiling n-heptane.

Example 4

Polymerization was carried out by introducing butene-1 in place of propylene gas under the same conditions as in Example 1 except that the polymerization temperature was maintained at 50° C. After 4 hours, 88 g. of white solid polymer in powder form were obtained. The polymer insoluble in boiling ether was 89% by weight. In the catalyst system not containing copper (I) chloride, there was obtained a waxy polymer, 35% of which was insoluble in ether.

Example 5

Polymerization was carried out by adding 100 cc. of styrene in place of propylene gas under the same conditions as in Example 1 except that n-heptane was used as a solvent. After 5 hours, 41 g. of white solid polymer in powder form were obtained. The analysis of infrared spectrum showed that this polymer was highly crystallized polystyrene.

Example 6

A polymerization vessel equipped with stirrer, thermometer and gas inlet filled with 250 ml. of refined kerosene was charged with 10 ml. of kerosene solution of diethyl aluminium ethoxide (concentration 1.0 mol/l.) while stirring in an atmosphere of nitrogen gas, and suspension of 0.67 g. of aluminium chloride in kerosene was introduced, which was followed by the addition of 14.8 ml. of titanium trichloride complex suspension (containing 1.01 mols of titanium trichloride per liter) prepared by the method as described in the above Example 1. The mixture liquid was heated, while stirring, to 70° C., followed by continuous introduction of propylene for polymerization. After 4 hours from the beginning of polymerization, the introduction of propylene was stopped and the resulting mixture was treated with an aqueous solution of methanol-hydrochloric acid. Then after well washing with methanol, this mixture was dried under reduced pressure and 99 g. of polypropylene in white powder form were obtained. This polymer was extracted with boiling n-heptane by means of Soxhlet extractor, the insoluble polymer being 90%, and it was shown by X-ray diffraction and infrared spectrum analysis that the polymer was high crystalline polypropylene. Also, the intrinsic viscosity of the polymer insoluble in boiling n-heptane was 4.45, and the viscosity average molecular weight was $68 \times 10^4$.

When polymerization was carried out under the like conditions as in the above except that aluminium chloride this polymer was extracted with boiling n-heptane, the polymerization was carried out by introducing 88% by this polymer was extracted with boiling n-heptane, the polymer insoluble in boiling n-heptane was only 20%.

Example 7

Under the same conditions as described in Example 6, polymerization was carried out by introducing 88% by volume of propylene and 12% by volume of ethylene. Using the catalyst system containing aluminium cloride, 70 g. of white solid polymer in powder form were obtained after 4 hours. The polymer insoluble in boiling n-heptane reached 89%. Infrared spectrum analysis showed that this polymer was a copolymer of ethylene and propylene.

Example 8

Propylene was polymerized under the same conditions as in Example 6 except that aluminium bromide was used in place of aluminium chloride and hydrogen was added to a pressure of 0.2 kg./cm.$^2$ (0.70% by volume based on the total feeding amount of propylene) prior to the introduction of propylene. Consequently, 73 g. of polypropylene in white powder form were obtained.

The obtained polymer was extracted with boiling n-heptane and the polymer insoluble in the solvent was 93% and the viscosity average molecular weight was $34 \times 10^4$.

Example 9

Propylene was polymerized under the same conditions as in Example 1 except that metallic salts listed in table below were used in place of copper (I) chloride. Said metallic salts which were used instead of copper (i) chloride were all suspended in kerosene (concentration 1 mol/l.) before the addition.

TABLE

| Metallic salt | Amount of kerosene suspension added (ml.) | Yield (g.) | Polypropylene insoluble in boiling n-heptane (percent) |
|---|---|---|---|
| $CuCl_2$ | 2.5 | 12.0 | 87 |
| $Hg_2Cl_2$ | 5.0 | 5.3 | 93 |
| $HgCl_2$ | 5.0 | 5.0 | 88 |
| $SnCl_4$ | 2.5 | 48 | 95 |
| $SbCl_5$ | 2.5 | 20 | 98 |
| $PbCl_2$ | 5.0 | 100 | 71 |

Example 10

Some 200 mmol of vanadium (V) oxytrichloride were dissolved in 1 l. of refined kerosene, added dropwise followed by the addition of 210 mmol of kerosene solution of diethyl cadmium with stirring in an atmosphere of nitrogen gas at room temperature and the stirring was continued for 5 hours at this temperature. Then 200 ml. of this solution were fed in an atmosphere of nitrogen gas into a 1-liter stainless steel autoclave. Then 40 ml. of kerosene suspension of ethyl aluminium dipropoxide (concentration 1.4 mol/l.) were added thereto, followed by further addition of 2.7 g. of anhydrous zinc chloride. This mixture was heated to 60° C. and while introducing propylene under a pressure of 7 kg./cm.$^2$ polymerization proceeded for 5 hours at said temperature. After adding 200 cc. of n-butanol, followed by stirring at 100° C. for 1 hour, the autoclave was cooled. The reaction mixture was taken out, powder of polymer was filtered out, washed with water and dried under a reduced pressure and 120 g. of powdered polypropylene were obtained. The polymer insoluble in boiling n-heptane was 78.9% and the viscosity average molecular weight was $75 \times 10^4$.

Example 11

With stirring 1 liter of refined kerosene and 200 mmol of chromium trichloride in nitrogen atmosphere 220 mmol of kerosene solution of butyl lithium were mixed therewith and the stirring was continued for 5 hours at 100° C. After cooling the reaction mixture, 200 ml. of said mixture were fed into a 1-liter stainless steel autoclave, 30 ml. of kerosene solution of diphenyl aluminium phenoxide (concentration of 1.0 mol/l.) were added thereto, then 6.2 g. of antimony trichloride were added, heated to 60° C. with stirring, and propylene was introduced under a pressure maintained at 7 kg./cm.$^2$. The polymerization proceeded for 5 hours. After the addition of 200 ml. of n-butanol and stirring an hour at 100° C., the autoclave was cooled. The product mixture was taken out and the powdered polymer was filtered. The obtained powder of polymer was thoroughly washed with hot water, dried under reduced pressure and thus 93 g. of polypropylene were obtained. The residue of this polymer after extraction with boiling n-heptane was 82% and the viscosity average molecular weight thereof was $83 \times 10^4$.

When polymerization was carried out similarly without adding antimony trichloride, most of the obtained polypropylene was amorphous, the part insoluble in boiling n-heptane being only 33%.

Example 12

With stirring 1 liter of refined kerosene and 200 mmol of titanium tetrachloride in nitrogen atmosphere, 250 mmol of kerosene suspension of phenyl magnesium chloride were admixed therewith, and the stirring was continued for 5 hours at 100° C. After cooling the mixture, 200 ml. of said mixture were fed into a 1-liter stainless steel autoclave, 30 ml. of kerosene solution of dibutyl aluminium butoxide (concentration of 1.0 mol/l.) were added, 3.6 g. of aluminium bromide were further fed into and while stirring the admixture, propylene was polymerized for 5 hours at 70° C. under a pressure of 10 kg./cm.² After the product mixture was treated as in Example 11, 103 g. of polypropylene were obtained. The residue of this polypropylene after extraction with boiling n-heptane was 87% and the viscosity average molecular weight was $93 \times 10^4$.

We claim:

1. A process for preparation of polypropylene having high crystallinity which comprises polymerizing propylene in the presence of a catalytic amount of catalyst composition prepared by admixing the following three components:
    (1) The reaction product insoluble in hydrocarbon obtained by reacting (a) titanium tetrachloride with (b) organometallic compound of aluminum.
    (2) The compounds represented by the general formula $$AlR_n(OR')_{3-n}$$

wherein R and R' are alkyl radical and aryl radical and $n$ is an integer from 1 to 2.
    (3) The halides of metals selected from the group consisting of the metals of Groups I–B, II–B, III–B, IV–B and V–B of the Periodic Table, the mol ratio of the component (1) to the component (2) being from 5:1 to 1:3, and the mol ratio of the component (2) to the component (3) being from 10:1 to 1:1.

2. A process for preparation of polypropylene having high crystallinity which comprises polymerizing propylene in the presence of a catalyst composition prepared by admixing the following three components;
    (1) The reaction product insoluble in hydrocarbon obtained by reacting (a) titanium tetrachloride with (b) dialkyl aluminium halide.
    (2) The compounds represented by the general formula $$AlR_2(OR')$$

wherein R and R' are alkyl radical and aryl radical.
    (3) The halides of metals selected from the group consisting of the metals of Groups I–B, II–B, III–B, IV–B and V–B of the Periodic Table, the mol ratio of the component (1) to the component (2) being from 5:1 to 1:3, and the mol ratio of the component (2) to the component (3) being from 10:1 to 1:1.

3. A process for preparation of polypropylene having high crystallinity which comprises polymerizing propylene in the presence of a catalytic amount of catalyst composition prepared by admixing the following three components;
    (1) The reaction product insoluble in hydrocarbon obtained by reacting (a) titanium tetrachloride and (b) dialkylaluminium halide (wherein said alkyl radical has from 1 to 4 carbon atoms).
    (2) The compound represented by the general formula $$AlR_2(OR')$$

in which R is an alkyl radical having from 1 to 4 carbon atoms and R' is an alkyl radical having from 1 to 4 carbon atoms and a phenyl radical.
    (3) The chlorides of metals selected from the group consisting of the metals of Groups I–B, II–B, III–B, IV–B and V–B of the Periodic Table, the mol ratio of the component (1) to the component (2) being from 5:1 to 1:3 and the mol ratio of the component (2) to the component (3) being from 10:1 to 1:1.

4. A process for preparation of polypropylene having high crystallinity which comprises polymerizing propylene in the presence of a catalytic amount of catalyt composition prepared by admixing the following three components;
    (1) The reaction product insoluble in hydrocarbon obtained by reacting (a) titanium tetrachloride with (b) dialkyl aluminium halide, wherein said alkyl radical has from 1 to 4 carbon atoms.
    (2) The compounds represented by the general formula $AlR_2(OR')$ wherein R is an alkyl radical having from 1 to 4 carbon atoms and R' is an alkyl radical having from 1 to 4 carbon atoms and a phenyl radical.
    (3) Aluminium chloride, the mol ratio of the component (1) to the component (2) being from 5:1 to 1:3 and the mol ratio of the component (2) to the component (3) being from 10:1 to 1:1.

5. A process for preparation of polypropylene having high crystallinity which comprises polymerizing propylene in the presence of a catalytic amount of catalyst composition consisting of the following three components;
    (1) The reaction product insoluble in hydrocarbon obtained by reacting (a) titanium tetrachloride and (b) dialkyl-aluminium halide, wherein said alkyl radical has from 1 to 4 carbon atoms.
    (2) The compounds represented by the general formula $$AlR_2(OR')$$

wherein R is an alkyl radical have from 1 to 4 carbon atoms and R' is an alkyl radical having from 1 to 4 carbon atoms and a phenyl radical.
    (3) Copper (I) chloride, the mol ratio of the component (1) to the component (2) being from 5:1 to 1:3 and the mol ratio of the component (2) to the component (3) being from 10:1 to 1:1.

6. A process for the preparation of 1-olefin homopolymers of copolymers having a high crystallinity by polymerising a 1-olefin selected from the group consisting of propylene, butene-1 and a mixture thereof with ethylene in the presence of a catalyst composition, said catalyst composition consisting of an admixture of the following three components: (1) an active complex insoluble in liquid hydrocarbon obtained by reacting (a) a halogen compound of a metal at the highest valency selected from the group consisting of the metal of Groups IV–A, V–A and VI–A of the Periodic Table with (b) an organometallic compound of the metal selected group the consisting of alkali metals, alkaline earth metals, zinc, cadmium and earth metals, (2) a compound represented by the general formula:

$$AlR_n(OR')_{3-n}$$

wherein R and R' are a lower alkyl radical and a phenyl radical and $n$ is an integer from 1 to 2, and (3) a halide of a metal selected from the group consisting of the metals of Groups I–B, II–B, III–B, IV–B and V–B of the Periodic Table, the mol ratio of the catalyst component (1) to the catalyst component (2) is from 10:1 to 1:20, and the mol ratio of catalyst component (3) to catalyst component (2) being from 0.1–10:1.

References Cited

UNITED STATES PATENTS

| | | | |
|---|---|---|---|
| 3,313,791 | 4/1967 | Price et al. | 260—93.7 |
| 2,904,542 | 9/1959 | Fasce et al | 260—94.9 |
| 2,939,846 | 6/1960 | Gordon et al. | 260—431 |
| 3,035,035 | 5/1962 | Mensikona et al. | 260—93.7 |
| 3,075,960 | 1/1963 | Lovett et al. | 260—93.7 |
| 3,035,036 | 5/1962 | Lundberg et al. | 260—94.9 |
| 3,131,171 | 4/1964 | Colfee | 260—94.9 |
| 3,225,022 | 12/1965 | Anderson et al. | 260—94.9 |

FOREIGN PATENTS

| | | |
|---|---|---|
| 785,314 | 10/1957 | Great Britain. |
| 837,251 | 6/1960 | Great Britain. |

JOSEPH L. SCHOFER, *Primary Examiner.*

M. KURTZMAN, *Assistant Examiner.*

U.S. Cl. X.R.

252—429; 260—88.2, 93.5, 93.7, 94.9